Nov. 25, 1930.  A. B. SMITH ET AL  1,782,795
MIXING APPARATUS
Filed Sept. 7, 1929    2 Sheets-Sheet 1

INVENTORS
Alfred Bartlett Smith
Clifford Ross Smith
By Andrew Wilson
    attorney.

Nov. 25, 1930. A. B. SMITH ET AL 1,782,795
MIXING APPARATUS
Filed Sept. 7, 1929  2 Sheets-Sheet 2

INVENTORS.
Alfred Bartlett Smith
Clifford Ross Smith
By Andrew Wilson
Attorney.

Patented Nov. 25, 1930

1,782,795

UNITED STATES PATENT OFFICE

ALFRED BARTLETT SMITH AND CLIFFORD ROSS SMITH, OF WOLVERHAMPTON, ENGLAND

MIXING APPARATUS

Application filed September 7, 1929, Serial No. 390,913, and in Great Britain March 22, 1929.

This invention relates to improvements in mixing apparatus and refers particularly to mixing apparatus of the type comprising a cylindrical pan to receive the materials to be mixed and mixing arms or blades carried by a vertical spindle passing through the centre of the pan.

The spindle is frequently driven through gearing enclosed in a casing below the pan.
In some cases the drive may be overhead but as a rule there is at least one bearing below the pan.

One of the uses of machines of this type is for preparing sand for foundry purposes, and a difficulty may be experienced in practice in preventing particles of the material under treatment getting into the bearings or gearing of the machine.

The entry of this material into any of the bearings or into the gearing causes rapid wear and so reduces the working life of the machine.

The objects of the present improvements are to provide means for preventing the entry of such materials into the bearings or gearing of the machine and to arrange for the discharge clear of the machine of any material which may pass over the inner lip of the pan.
We accomplish these objects by the means illustrated in the appended drawing, in which:—

Figure 1:
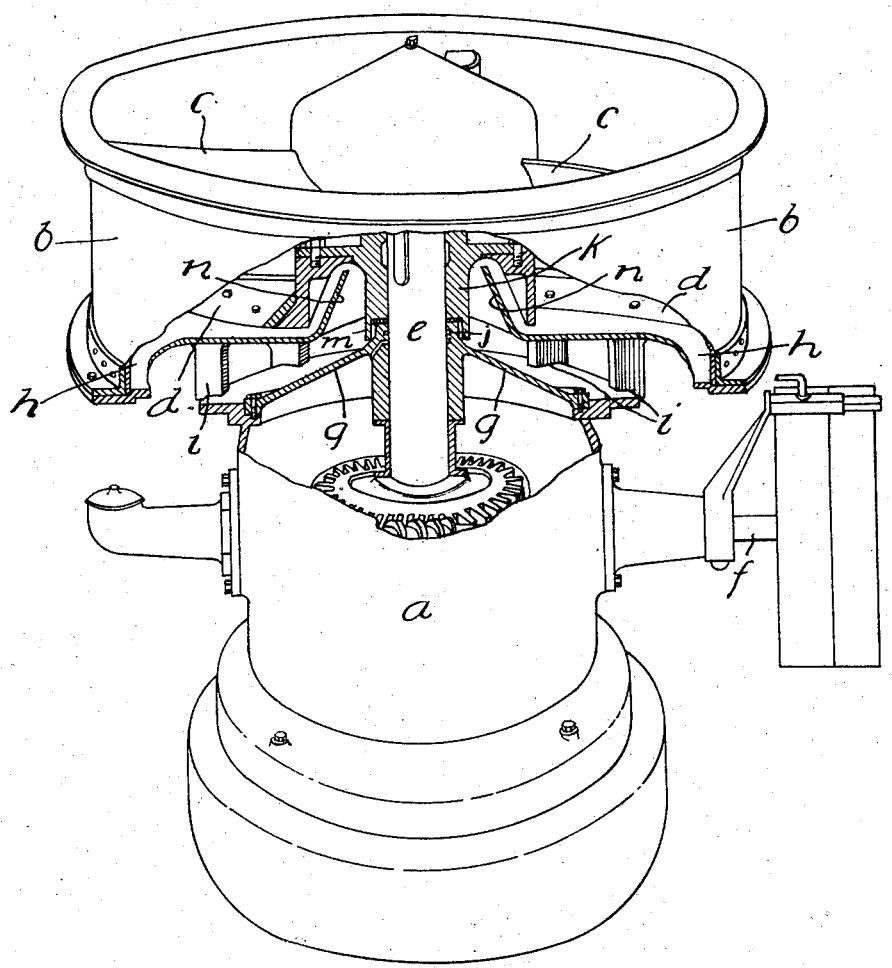
Figure 2:
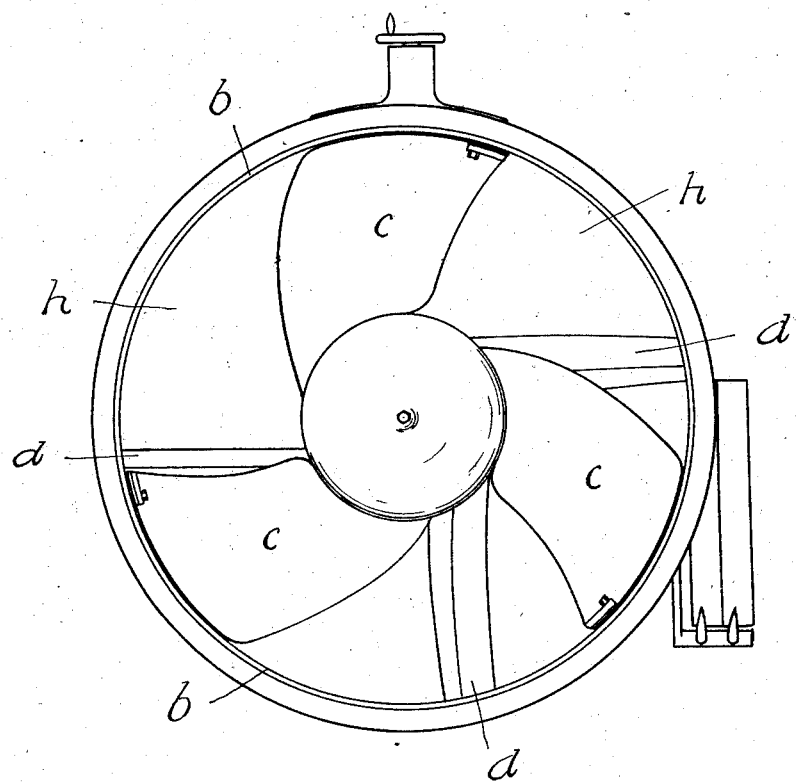

Figure 1 is a perspective view partly in section of a preferred type of machine with the invention applied thereto; and Figure 2 is a plan view thereof.

$a$ is the standard or base of the machine, $b$ the container pan, $c$ fixed mixing blades or pressure surfaces secured to the pan, $d$ the rotary mixing blades carried by the vertical shaft $e$ driven by the driving shaft $f$. The standard or base $a$ encloses the gearing and lower bearing for the vertical shaft $e$ of the machine.
The upper end of the standard or casing $a$ is raised into, or provided with, a conical or domed protector plate $g$ and the base $h$ of the pan $b$ which is supported on the standard is cast or otherwise provided with a number of spaced feet $i$ or ribs leaving between them a number of passages extending to the outer part of the base. The feet $i$ may conveniently be stepped to stand upon the flanged edge of the standard so as to space the base $h$ of the pan $b$ above the conical plate $g$.

At the centre, the protector plate or surface $g$ has an upstanding collar or sleeve $j$ around the vertical shaft $e$, and the rotor or boss $k$, keyed on the shaft, and carrying the rotary arms $d$, has a depending skirt $m$ fitting over this collar; suitable packing can be inserted, if desired.

If any of the material under treatment in the pan $b$ flows over the lip $n$ of the inner, upstanding wall of the pan which surrounds the shaft, it falls onto the conical or domed protector $g$ and passes away through the spaces or passages which are left between this top and the base $h$ of the pan by the feet $i$, and is discharged outside the standard or casing $a$ of the machine.

We claim:—

1. Apparatus for treating finely divided materials comprising in combination a pan or container, a shaft rotatable about a vertical axis therein and carrying means for treating the materials in the pan, driving means for the shaft, an upstanding inner wall on the pan around the shaft, a protecting surface surrounding the shaft below said upstanding inner wall of said pan, and means for spacing the base of the pan away from said protecting surface to form discharge passages for leading outside of the machine any materials which may overflow the inner wall of said pan.

2. Apparatus for treating finely divided materials comprising a pan or container, a rotatable shaft therein, carrying means for treating the materials, driving means for the shaft, an upstanding inner wall of the pan around the shaft, means for protecting the shaft below said upstanding inner wall of the pan, and means consisting of feet on the base of the pan for spacing said base from said protecting means and forming discharge passages leading outside the machine any materials which may overflow the inner wall of the pan.

3. Apparatus for treating finely divided materials comprising in combination a pan or container, a shaft rotatable about a vertical axis therein and carrying means for treating the materials in the pan, driving means for the shaft, an upstanding inner wall on the pan around the shaft, a protecting surface surrounding the shaft below said upstanding wall on said pan, said surface being of conical form and completely roofing over the lower part of the machine, and means for spacing the base of the pan from said surface consisting of a series of feet on the base of the pan so that discharge passages leading outside the machine are thereby formed for any materials which may escape over the inner wall of the pan.

4. Apparatus for treating finely divided materials, comprising in combination a standard supporting a container pan, a vertical shaft mounted in said standard, driving gear therefor within said standard, said shaft projecting centrally into the container pan and having mixer blades secured upon it within the pan; an inner wall on the base of the pan surrounding the shaft below the attachment of the mixer blades, a collar on said shaft for carrying the blades, said collar having a depending skirt, a raised protecting surface on said standard surrounding the vertical shaft below the inner wall of the pan, an upstanding part on said surface around said shaft overhung by the skirt on said blade-carrying collar, and stepped feet on the base of the pan resting on said standard and spacing the pan away from said raised protecting surface to form discharge passages leading outside the machine any materials which may overflow the inner wall of the base of the pan.

In testimony whereof we affix our signatures.

ALFRED BARTLETT SMITH.
CLIFFORD ROSS SMITH.